United States Patent
McLaughlin et al.

(10) Patent No.: US 11,366,777 B2
(45) Date of Patent: Jun. 21, 2022

(54) PROCESS CONTROL DEVICE HAVING MODERN ARCHITECTURE AND LEGACY COMPATIBILITY

(71) Applicant: HONEYWELL INTERNATIONAL, INC., Morris Planes, NJ (US)

(72) Inventors: Paul F. McLaughlin, Ambler, PA (US); Ananthapadmanabha Krishnamurthy, Glendale, AZ (US); James M. Schreder, Perkasie, PA (US); John Rosa-Bian, Ambler, PA (US)

(73) Assignee: HONEYWELL INTERNATIONAL, INC., Morris Planes, NJ (US)

(*) Notice: Subject to any disclaimer, the term of this patent is extended or adjusted under 35 U.S.C. 154(b) by 0 days.

(21) Appl. No.: 16/438,252

(22) Filed: Jun. 11, 2019

(65) Prior Publication Data

US 2020/0394146 A1    Dec. 17, 2020

(51) Int. Cl.
*G06F 13/20* (2006.01)

(52) U.S. Cl.
CPC .......... *G06F 13/20* (2013.01); *G06F 2213/40* (2013.01)

(58) Field of Classification Search
CPC .............................. G06F 13/20; G06F 2213/40
See application file for complete search history.

(56) References Cited

U.S. PATENT DOCUMENTS

| | | | |
|---|---|---|---|
| 5,146,401 A | 9/1992 | Bansal et al. | |
| 5,546,301 A | 8/1996 | Agrawl et al. | |
| 6,138,049 A | 10/2000 | McLaughlin et al. | |
| 6,272,386 B1 | 8/2001 | McLaughlin et al. | |
| 6,672,963 B1* | 1/2004 | Link | A63F 13/10 463/43 |
| 7,313,448 B2 | 12/2007 | Detrich et al. | |
| 7,630,777 B2 | 12/2009 | Rudnick et al. | |
| 9,665,089 B2 | 5/2017 | Schreder et al. | |
| 2002/0078260 A1* | 6/2002 | Hart | G06F 9/4843 719/329 |
| 2004/0210348 A1* | 10/2004 | Imhof | H04L 41/00 700/275 |
| 2008/0034334 A1* | 2/2008 | Laouamri | G06F 11/2294 716/136 |
| 2008/0256564 A1* | 10/2008 | Fathalla | G06F 9/45537 719/331 |
| 2011/0085550 A1* | 4/2011 | Lecler | H04L 45/245 370/392 |
| 2014/0277764 A1* | 9/2014 | Burt | G05B 15/02 700/276 |
| 2016/0103431 A1* | 4/2016 | Ganapathi | G05B 15/02 700/20 |

(Continued)

OTHER PUBLICATIONS

Extended European Search Report for corresponding EP Application No. 20178132.5.

*Primary Examiner* — Idriss N Alrobaye
*Assistant Examiner* — Ronald T Modo
(74) *Attorney, Agent, or Firm* — Paschall & Associates; James C. Paschall; Anthony Miologos

(57) ABSTRACT

A apparatus having a control network and a first controller comprising a microprocessor configured to support communication functions, control execution functions, I/O functions, and control network interface functions, a second controller configured as a redundant partner to the first controller, and an I/O link and I/O modules.

12 Claims, 5 Drawing Sheets

(56) References Cited

U.S. PATENT DOCUMENTS

| | | | |
|---|---|---|---|
| 2016/0209834 A1* | 7/2016 | Schreder | G06F 9/544 |
| 2017/0228225 A1* | 8/2017 | Rachlin | G06F 9/455 |
| 2017/0344364 A1* | 11/2017 | Rachlin | G06F 7/50 |
| 2017/0371719 A1* | 12/2017 | Majumdar | G06F 9/5094 |
| 2018/0259923 A1 | 9/2018 | De et al. | |
| 2019/0025788 A1 | 1/2019 | Ganapathi et al. | |
| 2019/0385057 A1* | 12/2019 | Litichever | G06N 3/08 |

* cited by examiner

PROCESS CONTROL DEVICE HAVING MODERN ARCHITECTURE AND LEGACY COMPATIBILITY

TECHNICAL FIELD

This disclosure relates generally to industrial process control and automation systems. More specifically, this disclosure relates to an apparatus and method for controller upgrades which remain compatible with existing controller technology.

BACKGROUND

Industrial process control and automation systems are typically used to monitor and control complex and potentially volatile industrial processes without interruption, often running without scheduled downtime for years. Over time, a need may arise to upgrade one or more components in an industrial process control and automation system. This could be due to various factors, such as the desire to obtain improvements provided by new products or the need to replace obsolete products or address support issues. When one component of the industrial process control and automation system is upgraded, it is desirable to provide for compatibility with legacy technology. For example, a substantial base of controllers currently used in industrial process control and automation systems currently exists. It may be necessary to upgrade only a portion of existing controllers at a give time. It becomes desirable that the upgraded controllers and the legacy controllers work in harmony together within the industrial process control and automation system. This is especially true in distributed control systems (DCSs) with controllers that provide 1:1 redundancy to improve availability of the system when a primary controller fails. In such a system an upgraded controller may be paired in a redundant setting with a legacy controller. There is a need for upgraded controllers which retain compatibility with legacy controllers for use in industrial process control and automation systems.

SUMMARY

One embodiment involves an apparatus comprising a control network; a first controller comprising a microprocessor; the microprocessor configured to support communication functions, control execution functions, I/O functions, and control network interface functions; a second controller configured as a redundant partner to the first controller; and an I/O link and I/O modules. The microprocessor may be further configured with both ethernet protocols and RTBC protocols for communication with the control network. The microprocessor may be further configured to support both CEE and PAS/PXX control functions. The microprocessor may be further configured to detect whether the second controller redundant partner is a legacy controller. The microprocessor may comprise a hardware design allowing for location in a legacy chassis. The first controller may comprise a design allowing for integration into a legacy backplane. The microprocessor may be a virtual microprocessor. The microprocessor may further comprise a thunking layer supporting legacy operating systems on a modern operating system. The first controller may further comprise an IP core where the IP is a binary object. The microprocessor may be configured to multiplex communications to the I/O link. The microprocessor may be configured with a dual core. The microprocessor may be configured to support scheduling functions. The apparatus may further comprise a platform providing services to the communication functions, the control execution functions, the I/O functions, and the control network interface functions.

Another embodiment involves a method comprising detecting the nature of a redundant partner to a modern controller wherein the modern controller comprises a microprocessor configured to support communication functions, control execution functions, I/O functions, and control network interface functions; support both ethernet protocols and RTBC protocols for communication with a control network; and to support both CEE and PAS/PXX control functions; disabling the ethernet protocols and the CEE control function and utilizing the RTBC protocols and the PAS/PXX control function of the modern controller when the nature of the redundant partner is detected to be a legacy controller; and utilizing the ethernet protocols and the CEE control function of the modern controller when the nature of the redundant partner is detected to be another modern controller. The method may further comprise synchronizing the modern controller and the redundant partner. The method may comprise wherein the modern controller and the redundant partner have at least one single common synchronization point.

Another embodiment involves a method of upgrading controllers in an industrial automation system comprising: removing a legacy controller from a redundant pair of controllers in the system; and replacing the legacy controller with a modern controller wherein the modern controller comprises a single microprocessor configured to support communication functions, control execution functions, I/O functions, and control network interface functions. The method may further comprise synchronizing the modern controller with the remaining legacy controller of the redundant pair of controllers. The method may comprise wherein the synchronizing is performed using a common synchpoint. The method may further comprise maintaining an existing I/O link after replacing the legacy controller with a modern controller.

DETAILED DESCRIPTION

FIGS. 1 through 5, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Industrial automation is an important feature of today's industrial processing plants. There is a need for industrial automation systems to continually provide greater flexibility in the implantation and operation of industrial automation systems.

Figure 1:
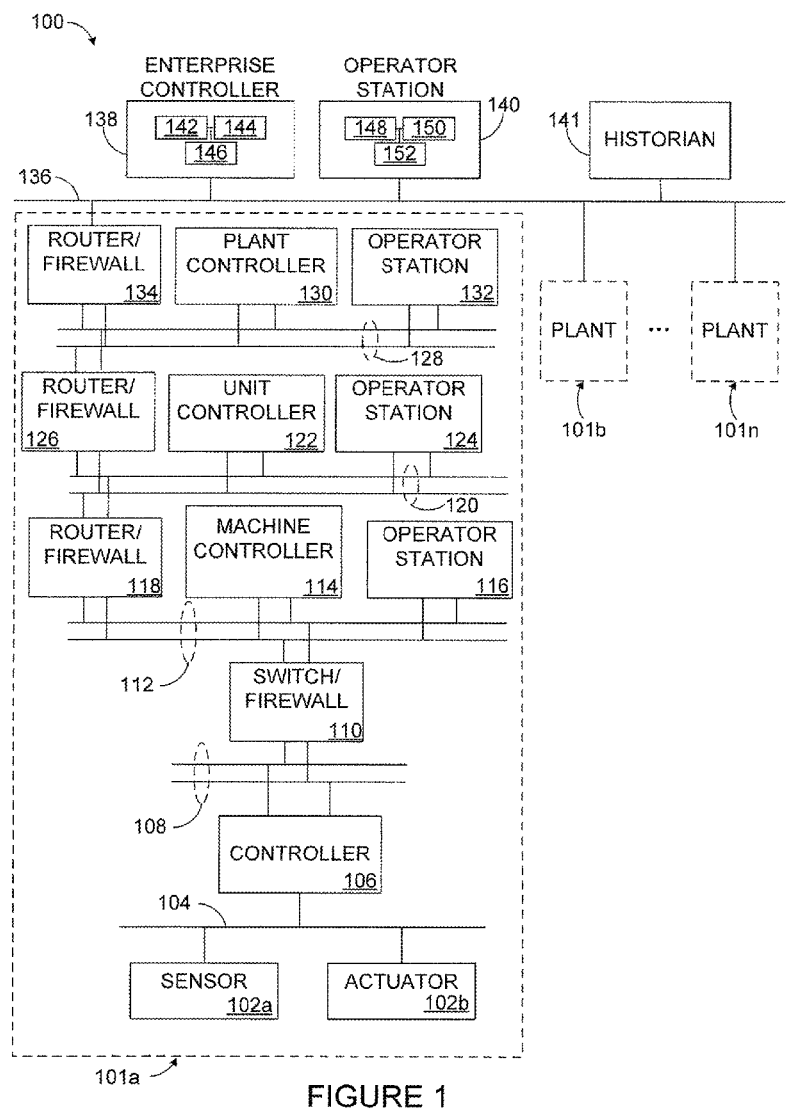
FIG. 1 illustrates an industrial process control and automation system.

FIG. 1 illustrates an example industrial automation system 100 according to this disclosure. As shown in FIG. 1, the system 100 includes various components that facilitate production or processing of at least one product or other material. For instance, the system 100 is used here to facilitate control over components in one or multiple plants 101a-101n. Each plant 101a-101n represents one or more processing facilities (or one or more portions thereof), such as one or more manufacturing facilities for producing at least one product or other material. In general, each plant 101a-101n may implement one or more processes and can individually or collectively be referred to as a process system. A process system generally represents any system or portion thereof configured to process one or more products or other materials in some manner.

In FIG. 1, the system 100 is implemented using the Purdue model of process control. In the Purdue model, "Level 0" may include one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could after a wide variety of characteristics in the process system. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting one or more conditions in a process system. The sensors and actuators may be generally referred to as field devices.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent an Ethernet network, an electrical signal network (such as a HART or FOUNDATION FIELDBUS network), a pneumatic control signal network, or any other or additional type(s) of network(s).

In the Purdue model, "Level 1" may include one or more controllers 106, which are coupled to the network 104. Among other things, each controller 106 may use the measurements from one or more sensors 102a to control the operation of one or more actuators 102b. For example, a controller 106 could receive measurement data from one or more sensors 102a and use the measurement data to generate control signals for one or more actuators 102b. Multiple controllers 106 could also operate in redundant configurations, such as when one controller 106 operates as a primary controller while another controller 106 operates as a backup controller (which synchronizes with the primary controller and can take over for the primary controller in the event of a fault with the primary controller). Each controller 106 includes any suitable structure for interacting with one or more sensors 102a and controlling one or more actuators 102b. Each controller 106 could, for example, represent a multivariable controller, such as a Robust Multivariable Predictive Control Technology (RMPCT) controller or other type of controller implementing model predictive control (MPC) or other advanced predictive control (APC). As a particular example, each controller 106 could represent a computing device running a real-time operating system.

Two networks 108 are coupled to the controllers 106. The networks 108 facilitate interaction with the controllers 106, such as by transporting data to and from the controllers 106. The networks 108 could represent any suitable networks or combination of networks. As particular examples, the networks 108 could represent a pair of Ethernet networks or a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as a pair of Ethernet networks or an FTE network.

In the Purdue model, "Level 2" may include one or more machine-level controllers 114 coupled to the networks 112. The machine-level controllers 114 perform various functions to support the operation and control of the controllers 106, sensors 102a, and actuators 102b, which could be associated with a particular piece of industrial equipment (such as a boiler or other machine). For example, the machine-level controllers 114 could log information collected or generated by the controllers 106, such as measurement data from the sensors 102a or control signals for the actuators 102b. The machine-level controllers 114 could also execute applications that control the operation of the controllers 106, thereby controlling the operation of the actuators 102b. In addition, the machine-level controllers 114 could provide secure access to the controllers 106. Each of the machine-level controllers 114 includes any suitable structure for providing access to, control of, or operations related to a machine or other individual piece of equipment. Each of the machine-level controllers 114 could, for example, represent a server computing device running a MICROSOFT WINDOWS operating system. Although not shown, different machine-level controllers 114 could be used to control different pieces of equipment in a process system (where each piece of equipment is associated with one or more controllers 106, sensors 102a, and actuators 102b).

One or more operator stations 116 are coupled to the networks 112. The operator stations 116 represent computing or communication devices providing user access to the machine-level controllers 114, which could then provide user access to the controllers 106 (and possibly the sensors 102a and actuators 102 b). As particular examples, the operator stations 116 could allow users to review the operational history of the sensors 102a and actuators 102b using information collected by the controllers 106 and/or the machine-level controllers 114. The operator stations 116 could also allow the users to adjust the operation of the sensors 102a, actuators 102b, controllers 106, or machine-level controllers 114. In addition, the operator stations 116 could receive and display warnings, alerts, or other messages or displays generated by the controllers 106 or the machine-level controllers 114. Each of the operator stations 116 includes any suitable structure for supporting user access and control of one or more components in the system 100. Each of the operator stations 116 could, for example, represent a computing device running a MICROSOFT WINDOWS operating system.

At least one router/firewall 118 couples the networks 112 to two networks 120. The router/firewall 118 includes any suitable structure for providing communication between networks, such as a secure router or combination router/firewall. The networks 120 could represent any suitable networks, such as a pair of Ethernet networks or an FTE network.

In the Purdue model, "Level 3" may include one or more unit-level controllers 122 coupled to the networks 120. Each unit-level controller 122 is typically associated with a unit in a process system, which represents a collection of different machines operating together to implement at least part of a process. The unit-level controllers 122 perform various functions to support the operation and control of components in the lower levels. For example, the unit-level controllers 122 could log information collected or generated by the components in the lower levels, execute applications that control the components in the lower levels, and provide secure access to the components in the lower levels. Each of the unit-level controllers 122 includes any suitable structure for providing access to, control of, or operations related to one or more machines or other pieces of equipment in a process unit. Each of the unit-level controllers 122 could, for example, represent a server computing device running a MICROSOFT WINDOWS operating system. Although not shown, different unit-level controllers 122 could be used to control different units in a process system (where each unit is associated with one or more machine-level controllers 114, controllers 106, sensors 102a, and actuators 102b).

Access to the unit-level controllers 122 may be provided by one or more operator stations 124. Each of the operator stations 124 includes any suitable structure for supporting user access and control of one or more components in the system 100. Each of the operator stations 124 could, for example, represent a computing device running a MICROSOFT WINDOWS operating system.

At least one router/firewall 126 couples the networks 120 to two networks 128. The router/firewall 126 includes any suitable structure for providing communication between networks, such as a secure router or combination router/firewall. The networks 128 could represent any suitable networks, such as a pair of Ethernet networks or an FTE network.

In the Purdue model, "Level 4" may include one or more plant-level controllers 130 coupled to the networks 128. Each plant-level controller 130 is typically associated with one of the plants 101a-101n, which may include one or more process units that implement the same, similar, or different processes. The plant-level controllers 130 perform various functions to support the operation and control of components in the lower levels. As particular examples, the plant-level controller 130 could execute one or more manufacturing execution system (MES) applications, scheduling applications, or other or additional plant or process control applications. Each of the plant-level controllers 130 includes any suitable structure for providing access to, control of, or operations related to one or more process units in a process plant. Each of the plant-level controllers 130 could, for example, represent a server computing device running a MICROSOFT WINDOWS operating system.

Access to the plant-level controllers 130 may be provided by one or more operator stations 132. Each of the operator stations 132 includes any suitable structure for supporting user access and control of one or more components in the system 100. Each of the operator stations 132 could, for example, represent a computing device running a MICROSOFT WINDOWS operating system.

At least one router/firewall 134 couples the networks 128 to one or more networks 136. The router/firewall 134 includes any suitable structure for providing communication between networks, such as a secure router or combination router/firewall. The network 136 could represent any suitable network, such as an enterprise-wide Ethernet or other network or all or a portion of a larger network (such as the Internet).

In the Purdue model, "Level 5" may include one or more enterprise-level controllers 138 coupled to the network 136. Each enterprise-level controller 138 is typically able to perform planning operations for multiple plants 101a-101n and to control various aspects of the plants 101a-101n. The enterprise-level controllers 138 can also perform various functions to support the operation and control of components in the plants 101a-101n. As particular examples, the enterprise-level controller 138 could execute one or more order processing applications, enterprise resource planning (ERP) applications, advanced planning and scheduling (APS) applications, or any other or additional enterprise control applications. Each of the enterprise-level controllers 138 includes any suitable structure for providing access to, control of, or operations related to the control of one or more plants. Each of the enterprise-level controllers 138 could, for example, represent a server computing device running a MICROSOFT WINDOWS operating system. In this document, the term "enterprise" refers to an organization having one or more plants or other processing facilities to be managed. Note that if a single plant 101a is to be managed, the functionality of the enterprise-level controller 138 could be incorporated into the plant-level controller 130.

Access to the enterprise-level controllers 138 may be provided by one or more operator stations 140. Each of the operator stations 140 includes any suitable structure for supporting user access and control of one or more components in the system 100. Each of the operator stations 140 could, for example, represent a computing device running a MICROSOFT WINDOWS operating system.

Various levels of the Purdue model can include other components, such as one or more databases. The database(s) associated with each level could store any suitable information associated with that level or one or more other levels of the system 100. For example, a historian 141 can be coupled to the network 136. The historian 141 could represent a component that stores various information about the system 100. The historian 141 could, for instance, store information used during production scheduling and optimization. The historian 141 represents any suitable structure for storing and facilitating retrieval of information. Although shown as a single centralized component coupled to the network 136, the historian 141 could be located elsewhere in the system 100, or multiple historians could be distributed in different locations in the system 100.

In particular embodiments, the various controllers and operator stations in FIG. 1 may represent computing devices. For example, each of the controllers could include one or more processing devices 142 and one or more memories 144 for storing instructions and data used, generated, or collected by the processing device(s) 142. Each of the controllers could also include at least one network interface 146, such as one or more Ethernet interfaces or wireless transceivers. Also, each of the operator stations could include one or more processing devices 148 and one or more memories 150 for storing instructions and data used, generated, or collected by the processing device(s) 148. Each of the operator stations could also include at least one network interface 152, such as one or more Ethernet interfaces or wireless transceivers.

Over time, a need or desire to upgrade one or more components in an industrial process control and automation system develops. However, it is rare for all components to be scheduled for an upgrade at the same time. To allow for upgrading only a portion of an existing set of components, it become important the upgraded component be compatible with the legacy component and the legacy control network. When upgrading controllers, it becomes desirable for upgraded controllers to be compatible with legacy controllers especially in systems providing 1:1 flexible redundancy where an upgraded controller may be paired with a legacy controller. Furthermore, migration from a legacy controller to a modern controller may need to be performed in situ without failure.

In the following description, a "legacy" controller refers to an existing controller not being replaced by a more recent, enhanced, or other device. A "legacy" protocol refers to a protocol used by a legacy controller, a "legacy" interface refers to an interface that supports the use of a legacy protocol, and a "legacy" network refers to a network that supports the use of a legacy protocol. A "modern" or "enhanced" or "upgraded" controller refers to a device that is replacing a legacy controller. An "enhanced" protocol refers to a protocol used by a modern or enhanced controller, an "enhanced" interface refers to an interface that supports the use of an enhanced protocol, and an "enhanced" network refers to a network that supports the use of an enhanced protocol. Note that the terms "migration" and "replacement" (and their derivatives), when used with reference to a legacy controller, include both a physical replacement of the legacy controller with a modern or enhanced controller and the integration of the modern controller within the system.

Turning to the controllers, each controller is connected to a network interface module (NM) via a gateway. Each controller is also connected to an input/output (I/O) subsystem including an I/O link and I/O modules. Therefore, each controller has two communication parts, the universal control network (UCN) connection upon which communication are made to the NIM, and potentially to other devices on the UCN, and the second communication part to the I/O link. In some legacy systems the communication components each require physical hardware including one board for communication control another board for the UCN interface and a third for the I/O link. In some legacy systems, the UCN interface uses a coax medium while in others the UCN interface was replaced to use an ethernet medium.

Legacy controllers may have employed two microprocessors, in the communication and control function; one microprocessor for communications and the other microprocessor to support control functions. The I/O link function employed yet another microprocessor for I/O link communications; and the UCN interface employed yet another microprocessor which emulated the token bus interface with the UCN which was used in earlier versions. Thus, many legacy controllers have a total of 4 microprocessors, one supporting communications, one supporting control functions, one supporting the I/O link, and one supporting the UCN interface. An advancement of the upgraded controller is that all of the functionality of the four legacy microprocessors are implemented on a single microprocessor. Moving to this single microprocessor configuration allows a change from the legacy 8-bit microcontroller to commercially available FPGA. Having the modern architecture allows for adding the latest control technology as a parallel execution environment; adding additional networking supporting the latest modern forms of control and I/O integration, including an I/O mesh configuration; and adding on-board security features, such as firmware protection and encryption, to allow the node to work without an external control firewall.

Additionally, separate hardware for communication function and control function is now merged into a single interface. The new merged hardware is designed to be a drop-in replacement for the legacy hardware. For example, a new card is designed to be located in a legacy chassis to preserve the cabinet, power supply, redundancy path and other current features of existing systems. The modern controller is a drop-in replacement for a legacy controller and sits in the same backplane as that of the legacy controller.

Communication functions and control functions previously used microprocessors having specific software. Further, there was shared RAM between (1) the communication function and the control function, between (2) the communication and control functions and the I/O link function, and between (3) the communication and control functions and the UCN interface. Therefore, there is a need to use the same software source code used for legacy communication functions, control functions, IO link functions and UCN interface functions, on the new microprocessor used in the modern controller. Any modern controller that replaces a legacy controller should be able to function as a redundant partner to a legacy controller, there is a need for the modern controllers to be completely compatible with the legacy controllers.

In a legacy system, different components such as communication and control must share resources. For example, global memory is shared between the communication function and the control function and the redundant token bus controller (RTBC). Legacy systems use the RTBC to exchange data between redundant partners, the primary controller and the secondary controller, to synchronize the database. A modern controller must also be able to exchange data with a redundant partner, and therefore should be able to operate with RTBC protocols. Even though the modern controller has ethernet protocols, it still needs to be able to operate RTBC protocols to synchronize the data and be compatible with legacy controllers.

The modern controller has all the functionalities of a legacy controller and the additional enhancement features such as the modern control execution environment, all in the same platform. For example, the modern controller brings ethernet protocols for communication to downlink ethernet devices communicating over Modbus TCP/IP, IEC61850, HSRPRP/DLR and the like, but yet must also be compatible with the RTBC subsystem in the legacy controller for synchronization of the control database using a redundancy manager. The redundancy manager manages the legacy mode of redundancy communications as well as the modern ethernet private path-based redundancy depending on the platform type of the partner. Similarly, the modern controller supports the control execution environment (CEE) which is the control engine of the modern controller as well as simultaneously supporting the control engine of the legacy controller which may be parameter access server and point processing executive of the legacy controller system (PAS/PPX). Further there is a common database tracking mechanism, called a file system tracker (FST), which is used to synchronize the database of both CEE and PAS/PPX systems. In the embodiment where a modern controller is paired with a legacy partner often the CEE will not function as the legacy partner does not typically support the CEE system. In that hybrid partnership, with one modern controller paired with one legacy controller in a redundant system, it is the PAS; PP that will be running. The CEE will run when both the redundant partners, the primary and the secondary controllers are modern controllers which both support the CEE system. The file system tracker captures the database changes in the primary controller that corresponds to both CEE and PAS/PPX when the primary controller is a modern controller and then synchronizes the database changes with its redundant partner which is the secondary controller and is also a modern controller using the redundancy manager. The file system tracker captures the database changes in the primary controller that corresponds to the PAS/PPX system when the primary controller is a modern controller and secondary controller is a legacy controller and then synchronizes the database changes with its redundant partner via the RTBC private path. When the modern controller is secondary, and the legacy controller is primary, the redundancy changes are sent to the modern secondary controller from the primary legacy controller via the RTBC private path and the modern secondary updates the database using the redundancy manager.

Further, the redundancy manager is configured to switch from using ethernet protocols or RTBC protocols depending upon whether the modern controller is paired with another modern controller, in which case ethernet protocols are employed, or whether the modern controller is paired with a legacy controller in which case RTBC protocols are employed. The modern controller has a means of detecting the type of redundant partner it is paired with and then engaging or utilizing the appropriate protocols.

The modern controller supports the legacy I/O link communication with the Process Manager family of I/O modules. This is achieved by using the FPGA based I/O link microprocessor which runs the legacy I/O link microprocessor's firmware image binary without any modification or recompile. The modern host microprocessor communicates with the FPGA based legacy I/O link microprocessor embedded in the same hardware via shared RAM and interrupts. The level one communication, i.e., the uplink communication, is an ethernet communication.

Figure 2:
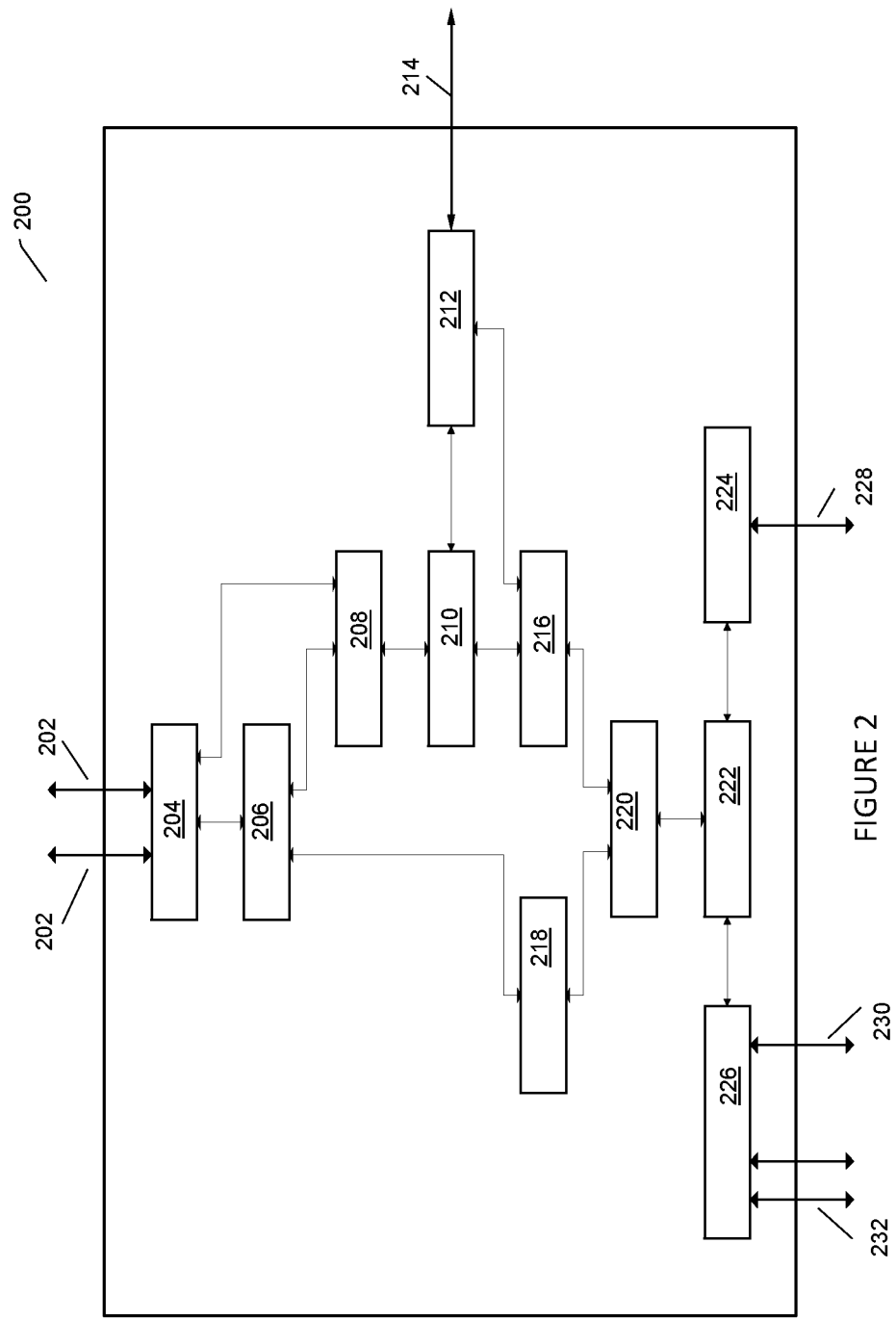
FIG. 2 Illustrates an exemplary software subsystem of the modern controller.

Turning to FIG. 2, an exemplary software subsystem 200 of the modern controller is shown. Note that software subsystem 200 contains software compatible with legacy controllers as well as software compatible with modern controllers. Two networks are coupled to the controller software subsystem 200 via ethernet connections 202. The networks could represent a pair of Ethernet networks or a redundant pair of Ethernet networks, such as a FAULT TOLERANT ETHERNET (FTE) network from HONEYWELL INTERNATIONAL INC. An FTE interface 204 provides the interface between the FTE and the modern controller. Control data access protocol (CDA) subsystem 206 is a communications protocol and may be an Experion Control Data Access Protocol. Legacy functionalities coexist with the modern functionalities on the modern platform in the same form-fit of the legacy hardware providing the ability to run the legacy control strategies and communicate to the legacy I/O system, interoperate with the legacy controllers and enable the user to take advantage of the modern control features like MIMO, batch management, ethernet downlink protocols, and the like. For example, emulated TBC 208, communications 210, and PAS/PXX 216 are present in addition to modern control execution environment (CEE) 218. An I/O interface 212 provides connection to I/O links 214. Subsystem 200 also comprises file system tracker 220 and redundancy manager 222. Depending upon whether the redundant partner is a modern controller or a legacy controller, redundancy manager 222 may engage RTBC protocols 224 and connection 228 or ethernet protocols 226 and connections 232 and 230. Subsystem 200 contains a mechanism to detect the type of redundant partner the modern controller is paired with in a redundant system. If the modern controller is partnered with a legacy controller, CEE 218 and ethernet protocols 226 may be moved to a disabled status and TBC 208, communications 210, PAS/PPX 216 and RTBC protocols 224 would be enabled. Conversely, if the modern controller is partnered with another modern controller, CEE 218 and ethernet protocols 226 may be enabled and TBC 208, communications 210, PAS/PPX 216 and RTBC protocols 224 are not disabled instead, the redundancy communication is switched from RTBC to Ethernet private path. In this way, subsystem 200 is completely compatible with other legacy controllers and other modern controllers.

Similarly, another advantage of the modern controller is the preservation of the address map of the controller's database so that it can retain fidelity with a legacy partner. This allows for a fail-over upgrade from a legacy controller to the modern controller.

Advantageously, when migrating to a modern controller, there is no change to the connection of the I/O link. In the Purdue model the level 1 controllers are connected to the UO modules on an I/O link network. Often the I/O modules have prefabricated cables that connect to the field termination assemblies. All field wiring terminates on the field termination assemblies. For example, the field wiring from the transmitters and the and field devices come to the field termination assemblies and connect to the I/O module via the prefabricated cables and the I/O module is connected to the controller though an I/O link medium such as a serial communication. Employing a modern controller does not affect the existing I/O modules, the field termination assemblies or the field devices. The communication and control hardware and the I/O link hardware is replaced though the use of the modern controller, but legacy I/O modules and existing connections are not altered even with the modern process architecture of the modern controllers. Thus, the modern controllers are compatible with the existing system of I/O modules, field termination assemblies, and field devices.

Software source code in each of the four microprocessors of the legacy controller may be a mix of legacy and modern coding language, Examples of legacy source code include Pascal code, Assembly code, and Field Programable Gate Array (FPGA). An example of modern coding language includes C/C++. A challenge in the modern controller was to run the same software platform with the same functionality as the legacy controller without rewriting the legacy source code for the modern platform. To accomplish this need, a translation mechanism is utilized. The translator takes the complied legacy source code generated from the legacy compliers and translates that compiled source code to modern source code depending on the target platform. See for example U.S. Pat. No. 10,248,463 and US 20170344364. With respect to at least the communication and control portion of legacy microprocessors, the move to the modern controller with a single microprocessor does not require changing or rewriting of the legacy communications and control source code. The complied output of the legacy source code is translated, built, and packaged to the target platform of the microprocessor of the modern controller. In other words, the source code from the obsolete, controller is translated to the latest micro machine code. With the source code being translated and built on the targeted platform, the communications and control functions must operate on the targeted platform just as if the operation was on the legacy operating system. The modern controller has an added thunking layer which allows for emulated MTOS and pascal runtime function thus retaining the compatibility with the legacy source code.

In some situations, binary code may be generated from the assembly source code using an assembler. The microprocessor itself may be run in a gate array, or a field programmable gate array (FPGA). An intellectual property (IP) core is a block of logic or data that is used in making a FPGA or application specific integrated circuit (ASIC) for a product. In electronic designs semiconductor IP core or IP block is a reusable unit of logic, cell, or integrated circuit (commonly called a chip) layout design that is the intellectual property of a specific party. The IP may include control strategies, displays, control language programs, history configurations and so on. The IP is preserved as binary object that was previously supported on a legacy controller and are now supported without changes on the modern controller. Subtleties like the database format is of the legacy microprocessor type (Big Endian) irrespective of the target platform (Big or Little Endian), and also preserved the point reference ID which may be known as Internal Entity ID in the TPM/TPS context. An IP core can run like a microprocessor and runs the microprocessor functions but implemented in a gate array. The binary code may be loaded into the memory of IP core which in turn may then use the binary code. Therefore, in these situations, an IP core technique may use the binary code so that there is no change to the legacy source code, i.e, the binary code.

Figure 3:
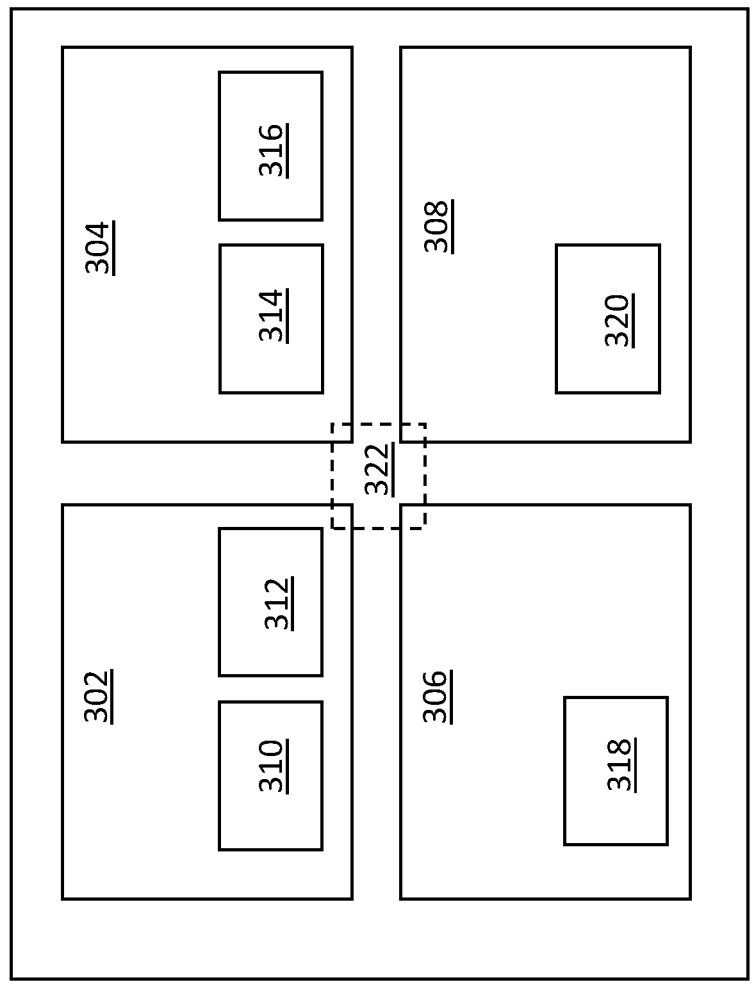
FIG. 3 shows source code translation of different programing languages within the functions of the modern controller.

Turning to FIG. 3, several functions supported by the microprocessor 300 of the modern controller are shown as communication 302, control 304, I/O link 306 and control network interface 308. Communication function 302 may have modern source code 310 such as C/C++ code, and legacy source code 312, such as Pascal code. Control function 304 may have modern source code 314 such as C/C++ code, and legacy source code 316, such as Pascal code. Control network interface function 306 may have only modern source code 318 such as C/C++ code. I/O link function may have binary code 320 generated from the assembly source code. A complier, or microprocessor 300, is configured to provide a translation mechanism 322 to translate legacy complied source codes, such as 312 and 316, into modern code languages so that legacy source codes do not have to be rewritten. See for example U.S. Pat. No. 10,248,463 and US 20170344364. As the target platform may differ, the translation mechanism is configured to provide the translated source code in the appropriate modern code language.

The modern controller further has a thunking layer which emulates the MTOS, Pascal runtime, and customer scheduler functions.

In one embodiment, the modern controller may be a virtual controller running under a virtual machine. It is not required that the modern controller be physical hardware. This embodiment is particularly advantageous for off-line engineering purposes and training. This is supported using a software 10 simulator. The virtual controller may or may not have a physical I/O link connectivity.

In another embodiment, the system has the capability to multiplex the IO link communication to enable both PAS/PPX and CEE access the IO link. The IO link may be single mastered and managed by the communications function, such as legacy communication subsystem, and enable the PAS/PPX to access the IO link. However, control such as CEE cannot access unless an IO link MUX is implemented in the software. In another embodiment the CEE and PAS/PPX can share a local peer to peer control connection where in the user can configure a modern control strategy under CEE that has a peer to peer relationship with the legacy control strategy running under PAS/PPX in the same controller.

In one embodiment, the UCN address, which is the address of the controller on the UCN (similar to MAC address in IP protocol) is ordinarily obtained from the hardware pinning. The modern controller will have the device index for the IP address in the hardware switch and the UCN address is assigned by an external server based on the Device Index to UCN address mapping that is configured by the user.

In another embodiment, the CEE and PPX have a single common synchronization point at which both PPX and CEE data is synchronized with its redundant partner at the beginning of the execution cycle. For example, if the CEE is executing at 25 ms cycle and PPX at 125 ms cycle, then CEE will have the synchpoint at the beginning of every 25 ms cycle and on the $5^{th}$ cycle both PPX and CEE will have the synch point. This is so that the secondary controller is in synch with primary controller of the redundant pair with respect to both CEE and PPX. Further, the failover logic involves the CEE synch state and the PXX synch state in addition to the I/O link and the UCN communication statuses when both redundant partners are new.

In the legacy controllers the communications function software and the control function software ran on separate microprocessors each having separate instances of MTOS. The tasks had priorities of 1-255 on both communications and control functions. PAS/PPX was part of the control function microprocessor. In the legacy controllers, it was possible that there could be a communications task at priority X and at the same time there was a control task that was also at priority X. As discussed above, on the modern controller both the communications function and the control function run on the same processor but with dual core. A custom scheduler may be implemented to manage and run all control related tasks on one core and communications related tasks on another core and thus avoiding any race between the same or higher priority tasks running on both communications and control.

Figure 4:
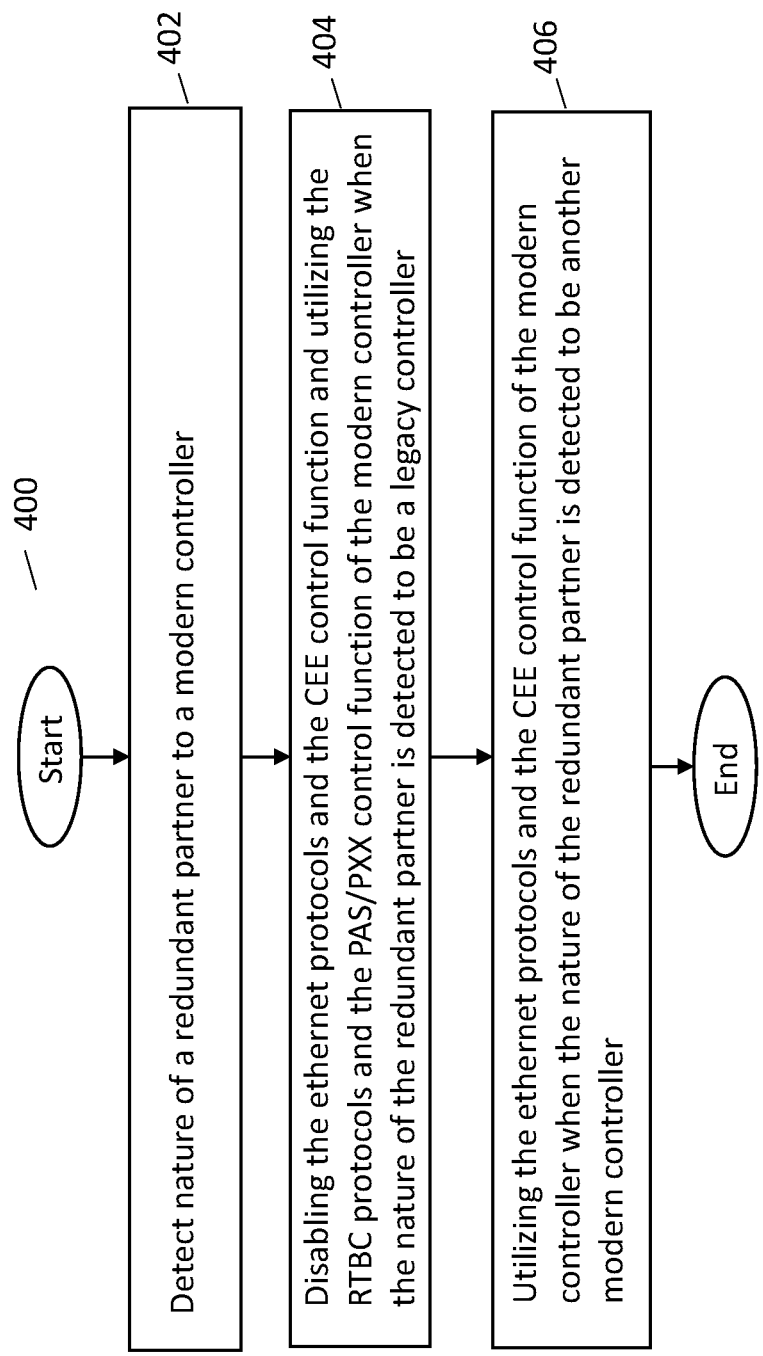
FIG. 4 shows a method using a modern controller.

Turning to FIG. 4, a method 400 is shown which has the step 402 of detecting the nature of a redundant partner which is followed by step 404 wherein the ethernet protocols and the control execution environment function are disabled and instead the RTBC protocols and the PAS/PXX control function are used when the redundant partner is detected to be a legacy controller. However, when the redundant partner is detected to be another modern controller, the ethernet protocols and the CEE control functions of the modern controller is used.

Figure 5:
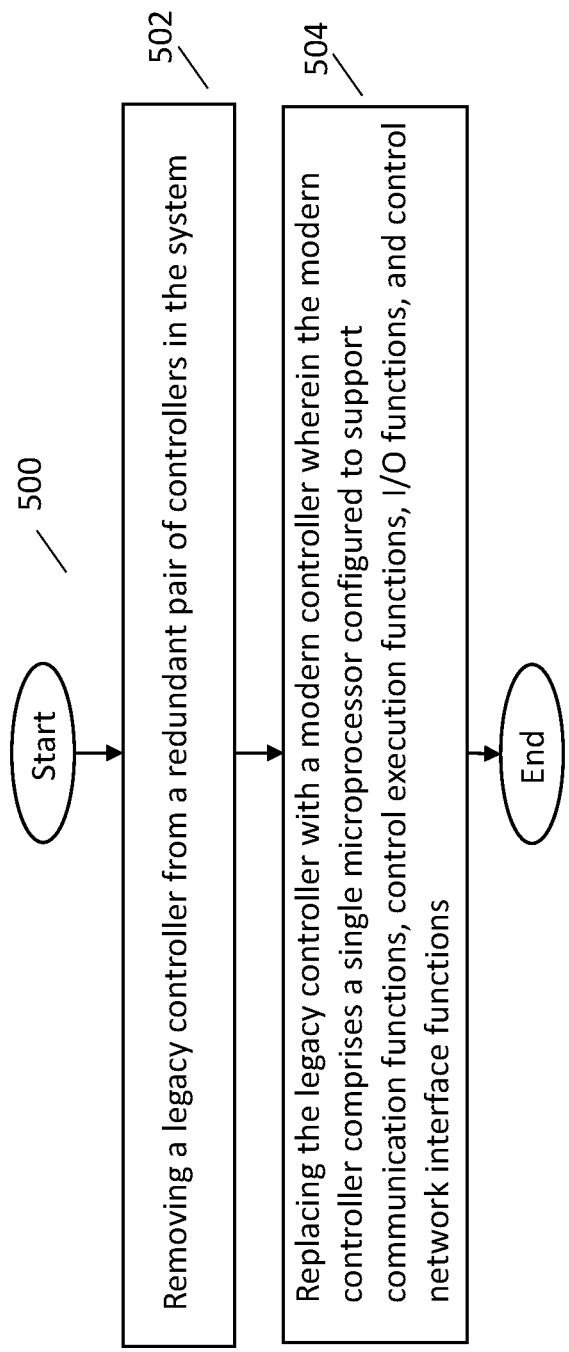
FIG. 5 shows a method of upgrading a redundant pair with a modern controller.

Turning to FIG. 5, a method 500 of upgrading a redundant pair of controllers is shown. 502 shows removing a legacy controller from a redundant pair of controllers in a system. 504 shows replacing the legacy controller with a modern controller comprising a single microprocessor configured to support communications functions, control execution functions, I/O functions, and control network interface functions.

A first embodiment is an apparatus comprising: a control network; a first controller comprising a microprocessor; the microprocessor configured to support communication functions, control execution functions, I/O functions, and control network interface functions; a second controller configured as a redundant partner to the first controller; and an I/O link and I/O modules. The apparatus of the first embodiment wherein the microprocessor is further configured with both ethernet protocols and RTBC protocols for communication with the control network. The apparatus of the first embodiment wherein the microprocessor is further configured to support both CEE and PAS/PXX control functions. The apparatus of the first embodiment wherein the microprocessor is further configured to detect whether the second controller redundant partner is a legacy controller. The apparatus of the first embodiment wherein the microprocessor comprises a hardware design allowing for location in a legacy chassis. The apparatus of the first embodiment wherein the first controller comprises a design allowing for integration into a legacy backplane. The apparatus of the first embodiment wherein the microprocessor is a virtual microprocessor. The apparatus of the first embodiment wherein the microprocessor further comprises a thunking layer supporting legacy operating systems on a modern operating system. The apparatus of the first embodiment wherein the first controller further comprises an IP core where the IP is a binary object. The apparatus of the first embodiment wherein the microprocessor is configured to multiplex communications to the I/O link. The apparatus of the first embodiment wherein the microprocess is configured with a dual core. The apparatus of the first embodiment further comprising the microprocessor configured to support scheduling functions. The apparatus of the first embodiment further comprising a platform providing services to the communication functions, the control execution functions, the I/O functions, and the control network interface functions.

A second embodiment is a method comprising detecting the nature of a redundant partner to a modern controller wherein the modern controller comprises a microprocessor configured to 1) support communication functions, control execution functions, I/O functions, and control network interface functions; 2) support both ethernet protocols and RTBC protocols for communication with a control network; and 3) to support both CEE and PAS/PXX control functions; disabling the ethernet protocols and the CEE control function and utilizing the RTBC protocols and the PAS/PXX control function when the nature of the redundant partner is detected to be a legacy controller; and utilizing the ethernet protocols and the CEE control function when the nature of the redundant partner is detected to be another modern controller. The second embodiment further comprising synchronizing the modern controller and the redundant partner. The second embodiment wherein the modern controller and the redundant partner have at least one single common synchronization point.

A third embodiment is a method of upgrading controllers in an industrial automation system comprising: removing a legacy controller from a redundant pair of controllers in the system; and replacing the legacy controller with a modern controller wherein the modern controller comprises a single microprocessor configured to support communication functions, control execution functions, I/O functions, and control network interface functions. The third embodiment further comprising synchronizing the modern controller with the remaining legacy controller of the redundant pair of controllers. The third embodiment wherein the synchronizing is performed using a common synchpoint. The third embodiment further comprising maintaining an existing I/O link after replacing the legacy controller with a modern controller.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

What is claimed is:

1. An apparatus comprising:
  a. a control network;
  b. a first controller comprising a microprocessor executing in a gate array, the gate array comprising an intellectual property (IP) core, wherein the IP core is a reusable unit of logic, a cell, or integrated circuit layout design that is an intellectual property (IP) of a specific party, the IP is binary object code representing control strategies, displays, control language programs, and history configurations, wherein the IP core is configured to run the microprocessor functions using binary code stored in a memory of the IP core that represents the microprocessor functions, wherein the microprocessor functions to support communication functions, control execution functions, I/O functions, and control network interface functions, and wherein the microprocessor supports a redundancy manager that utilizes an redundant token bus controller (RTBC) and an Ethernet protocol, wherein the microprocessor further comprises a thunking layer supporting legacy operating systems on a modern operating system, the thunking layer allows for emulated multi-tasking operating system (MTOS) and pascal runtime function to retain the compatibility with the legacy operating systems;
  c. a second controller configured as a redundant partner to the first controller, wherein the microprocessor functions to detect the nature of the redundant partner and disable the ethernet protocols and utilize the RTBC protocols and control functions associated to the modern operating system when the nature of the redundant partner is detected to be a legacy controller; and
  d. an VO link and VO modules.

2. The apparatus of claim 1 wherein the microprocessor is further configured with both ethernet protocols and redundant token bus controller (RTBC) protocols for communication with the control network.

3. The apparatus of claim 1 wherein the microprocessor is further configured to support both control execution environment (CEE) and parameter access server/point processing executive (PAS/PXX) control functions.

4. The apparatus of claim 1 wherein the microprocessor is further configured to detect whether the second controller redundant partner is a legacy controller.

5. The apparatus of claim 1 wherein the microprocessor comprises a hardware design allowing for location in a legacy chassis.

6. The apparatus of claim 1 wherein the first controller comprises a design allowing for integration into a legacy backplane.

7. The apparatus of claim 1 wherein the microprocessor is a virtual microprocessor.

8. The apparatus of claim 1 wherein the first controller further comprises an IP core where the IP is a binary object.

9. The apparatus of claim 1 wherein the microprocessor is configured to multiplex communications to the I/O link.

10. The apparatus of claim 1 wherein the microprocessor is configured with a dual core.

11. The apparatus of claim 10 further comprising the microprocessor configured to support scheduling functions.

12. The apparatus of claim 1 further comprising a platform providing services to the communication functions, the control execution functions, the I/O functions, and the control network interface functions.

* * * * *